(12) United States Patent
Wolfe

(10) Patent No.: US 8,536,493 B1
(45) Date of Patent: Sep. 17, 2013

(54) VERTICALLY STACKED AIR IMPINGEMENT TUNNEL OVEN

(75) Inventor: Ronald D. Wolfe, Wichita, KS (US)

(73) Assignee: Wolfe Electric, Inc., Wichita, KS (US)

( * ) Notice: Subject to any disclaimer, the term of this patent is extended or adjusted under 35 U.S.C. 154(b) by 367 days.

(21) Appl. No.: 12/956,442

(22) Filed: Nov. 30, 2010

(51) Int. Cl.
*F24C 15/20* (2006.01)
*F24C 15/32* (2006.01)
*A21B 1/26* (2006.01)
*A21B 1/48* (2006.01)
*A21B 3/04* (2006.01)
*F27B 9/02* (2006.01)

(52) U.S. Cl.
USPC .......... 219/400; 219/388; 219/394; 99/443 C; 99/474; 126/21 A; 432/163; 432/207

(58) Field of Classification Search
None
See application file for complete search history.

(56) References Cited

U.S. PATENT DOCUMENTS

| | | | | |
|---|---|---|---|---|
| 4,738,243 A | * | 4/1988 | Welsh et al. | 126/299 R |
| 4,884,552 A | * | 12/1989 | Wells et al. | 126/19 R |
| 5,025,775 A | * | 6/1991 | Crisp | 126/21 A |
| 5,277,105 A | * | 1/1994 | Bruno et al. | 99/443 C |
| 5,387,779 A | * | 2/1995 | Suzuki | 219/400 |
| 5,421,320 A | * | 6/1995 | Brown | 126/299 R |
| 5,673,681 A | * | 10/1997 | Neitzel et al. | 126/299 R |
| 6,341,601 B1 | * | 1/2002 | Ward et al. | 126/21 R |
| 6,936,793 B1 | * | 8/2005 | Shiloh et al. | 219/400 |
| 8,075,304 B2 | * | 12/2011 | Cox et al. | 431/90 |
| 8,093,533 B2 | * | 1/2012 | French et al. | 219/388 |

* cited by examiner

*Primary Examiner* — Joseph M Pelham
(74) *Attorney, Agent, or Firm* — Kenneth H. Jack; Davis & Jack, L.L.C.

(57) ABSTRACT

A vertically stacked air impingement tunnel oven including a plurality of baking cases having vertically aligned food ports; an electronically controlled heater system connected to the baking cases, the heater system being adapted for heating selected groups of baking cases, the heater system including a plurality of on/off switches which are correspondingly electrically connected for actuating the heating of the selected baking cases; an exhaust hood and exhaust fan having an inlet over the food ports; and a first electronic motor drive system connected operatively to the exhaust fan, and being adapted for rotating the exhaust fan a rotation speed among a plurality of preset rotation speeds, the drive system including the plurality of on/off switches which are further electrically connected for simultaneously actuating the exhaust fan at rotation speeds corresponding with the selected baking case group.

11 Claims, 4 Drawing Sheets

VERTICALLY STACKED AIR IMPINGEMENT TUNNEL OVEN

FIELD OF THE INVENTION

This invention relates to commercial food cooking ovens. More particularly, this invention relates to power vented and vertically stacked air impingement tunnel ovens and their electronic operation and control.

BACKGROUND OF THE INVENTION

Where commercial air impingement tunnel ovens are utilized and arranged in vertically stacked arrays of two or more baking cases, kitchen employees operating such ovens are often presented with difficulties and impediments which interfere with or disrupt their proper usage of the ovens. Such ovens typically present multiple switches and controls for actuation of the ovens' burner ignitors and valves. Also, such ovens typically present multiple switches and controls for actuation of the oven's tunnel traversing conveyors, and they further present multiple switches and controls for actuation of the oven's impingement air fans. Such ovens typically are equipped with additional controls for the actuation of the oven's exhaust fan. Such typical oven's presentation of such multiple and varied controls often results in the improper settings, improper control, and improper operation of the stacked ovens.

Upon such employee operator's proper setting and actuation of the controls of such multiply stacked air impingement tunnel ovens, further drawbacks and deficiencies are typically encountered upon the employee's actuation of the oven's exhaust fans. Such fans are typically set to operate at a speed which properly vents a lowermost oven in the vertical oven stack. In common usage, and during low cooking output demand situations, only an uppermost oven in the vertical stack may be actuated, heated, and utilized. In such circumstances, vertically directed air flow upwardly drawn by the exhaust fan and vertically crossing such uppermost oven's food passage ports often exceeds the air speed and flow volume needed for proper ventilation of the uppermost oven. Such excess air flow creates undesirable and excessive Bernoulli effects at such upper food passage ports, resulting in increases in aspiration of heated cooking gases and undesirably degrading the cooking performance of such uppermost oven.

The instant inventive vertically stacked air impingement tunnel oven solves or ameliorates the problems, challenges, and deficiencies discussed above by providing specialized combined switching of the blower fan, conveyer motor, electronic heater actuator and exhaust fan components of the oven, and by integrating as a part of such switching capability, variable, automatic, and presetable exhaust fan speed control.

BRIEF SUMMARY OF THE INVENTION

A first structural component of the instant inventive vertically stacked air impingement tunnel oven comprises a plurality of baking cases. Each baking case preferably has an interior space, a longitudinal food passage port, and an oppositely longitudinal food passage port. In the preferred configuration, the baking case's vertically stacked configuration vertically aligns their longitudinal and oppositely longitudinal food passage ports and allows for a simultaneous fan impelled vertically directed air stream to draw and purge cooking smoke and exhaust gases which may emit from the food passage ports.

A further structural component of the instant inventive oven comprises heater means which are connected operatively for heating selected groups of baking cases among the plurality of baking cases. The heater means preferably include and comprise a plurality of manually turnable or switchable on/off switches which are individually and correspondingly electrically connected for actuating the heater means' provision of heat to various selected groups of baking cases among the plurality of baking cases. In a preferred embodiment, the heater means comprise a plurality of electronically actuated gas burners, each of which is mounted operatively for heating one of the baking cases. Suitably, the heater means may alternatively comprise similarly operatively mounted pluralities of electric resistance heaters.

A further structural component of the instant inventive tunnel oven comprises an exhaust hood and exhaust fan combination, such combination preferably comprising longitudinal and oppositely longitudinal exhaust gas inlets which directly overlie the food passage ports among the baking cases' stacked and vertically aligned longitudinal and oppositely longitudinal food passage ports.

A further structural component of the instant inventive tunnel oven comprises first motor means which are preferably connected operatively to the exhaust fan. Preferably, the first motor means are adapted for alternatively rotating the exhaust fan at any one rotation speed among a plurality of selectable and preset rotation speeds. The first motor means preferably incorporates and comprises the same plurality of on/off switches which are an integral component of the heater means. Preferably, following methods and techniques which are conventionally known to those skilled in the art, said on/off switches are electrically connected for, upon their selective and corresponding actuations of the heater means, further actuating the exhaust fan at a suitable, preset, and performance optimizing rotation speed among the plurality of rotation speeds. Where, for example, a switch among the plurality of switches is actuated to heat an upper baking case among the plurality of baking cases, that switch is preferably further electrically connected and adapted for simultaneously actuating the first motor means at a lowest preset rotation speed. Alternatively, where said switches are set for heating a lower baking case, said switches are preferably connected and adapted for automatically actuating a highest preset exhaust fan rotation speed. Further alternatively, upon a switch setting for heating of another or intermediate baking case or cases, the corresponding switches preferably are connected and adapted for simultaneously and automatically actuating a preset intermediate exhaust fan rotation speed which is slower than the highest rotation speed and is faster than the slowest rotation speed.

Where, for example, three vertically stacked baking cases are provided, and where the plurality of on/off switches comprises three switches wired for directly corresponding electrical connection with the powered components of those baking cases, the instant invention will advantageously actuate the upper case's heater and simultaneously actuate the exhaust fan motor at a low preset rotation speed upon singly manipulating the on/off switch which is associated with the upper baking case. Alternatively, upon setting to their "on" positions a combination of switches including one which actuates of the powered components of the lower baking case, such switch setting advantageously automatically activates the exhaust fan at a high preset rotation speed. Intermediate on/off switch settings may further advantageously actuate other combinations of baking cases and burners while simultaneously actuating the exhaust fan at a preset intermediate rotation speed.

In a preferred embodiment of the instant invention, the first motor means which drive the exhaust fan comprise a variable speed 220 volt three phase electric induction motor. Also, for facilitating such motor's selective and preset speed control through manipulation of the plurality of on/off switches, an alternating current signal inverting and variable frequency drive controller is preferably mounted in electrical communication with an outside electrical power source, the three phase motor, and in electrical communication with the plurality of switches.

In a preferred embodiment of the instant inventive vertically stacked air impingement tunnel oven, continuous loop grate or cooking rack type conveyors extend through each baking case's interior from its longitudinal food passage port to its oppositely longitudinal food passage port, and second motor means are preferably provided for driving the continuous loop conveyors. In a preferred embodiment, the second motor means comprise a plurality of electric motors, each being directly operatively connected to one of the continuous loop conveyors. Such second motor means preferably further comprise the identical plurality on/off switches which are electrically connected for actuation and control of the heater means and the exhaust fan. In the same manner that the plurality of switches is electrically connected to directly correspond in one-to-one relationships with the heater means, such switches are preferably further electrically connected for providing simultaneous and one-to-one corresponding on/off control of the conveyor driving electric motors.

The instant inventive vertically stacked air impingement tunnel oven preferably further comprises a cooking air impingement system plurality of impingement fan, air plenum, air duct, and air jets combinations, each such combination preferably being operatively mounted within one of the baking cases. Such combinations preferably serve the function of directing jets of heated impingement air toward the continuous loop conveyors and toward food items carried thereupon. Third motor means are preferably connected operatively to such combinations' impingement fans, the third motor means preferably comprising a plurality of electric blower motors. In a preferred embodiment, the third motor means preferably further comprise the same plurality of on/off switches which, as discussed above, which facilitate electrical control of the heater means, the exhaust fan (first motor means), and the conveyor motor (second motor means) components. The plurality of on/off switches are preferably further electrically connected for providing direct and one-to-one corresponding actuations of impingement air driving motors upon the switch selected heating actuations of the baking cases served by their impingement fans.

According to the operation of the instant inventive vertically stacked air impingement tunnel oven, the array of or plurality of on/off switches are advantageously attached as part of and in simultaneous electrical communication with the oven case's heater means, the exhaust fan's speed controlled first motor means, and with the conveyors' and air impingement blowers' second and third motor means. As a result of such switch attachment and electrical communication, an operator of the inventive oven is able, upon his or her simple selection of and switched actuation of one or more oven cases to be heated and used, to correctly and consistently actuate each of the heater and motor means associated with the selected baking case or cases, and is able to automatically operate the oven's exhaust fan at an optimal speed which minimizes cooking gas aspirating Bernoulli effects at the oven's food passage ports.

Accordingly, it is an object of the instant invention to provide a vertically stacked air impingement tunnel oven which incorporates structures, as described above, and which arranges those structures in relation to each other in manners described above, to achieve the beneficial functions and advantages described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
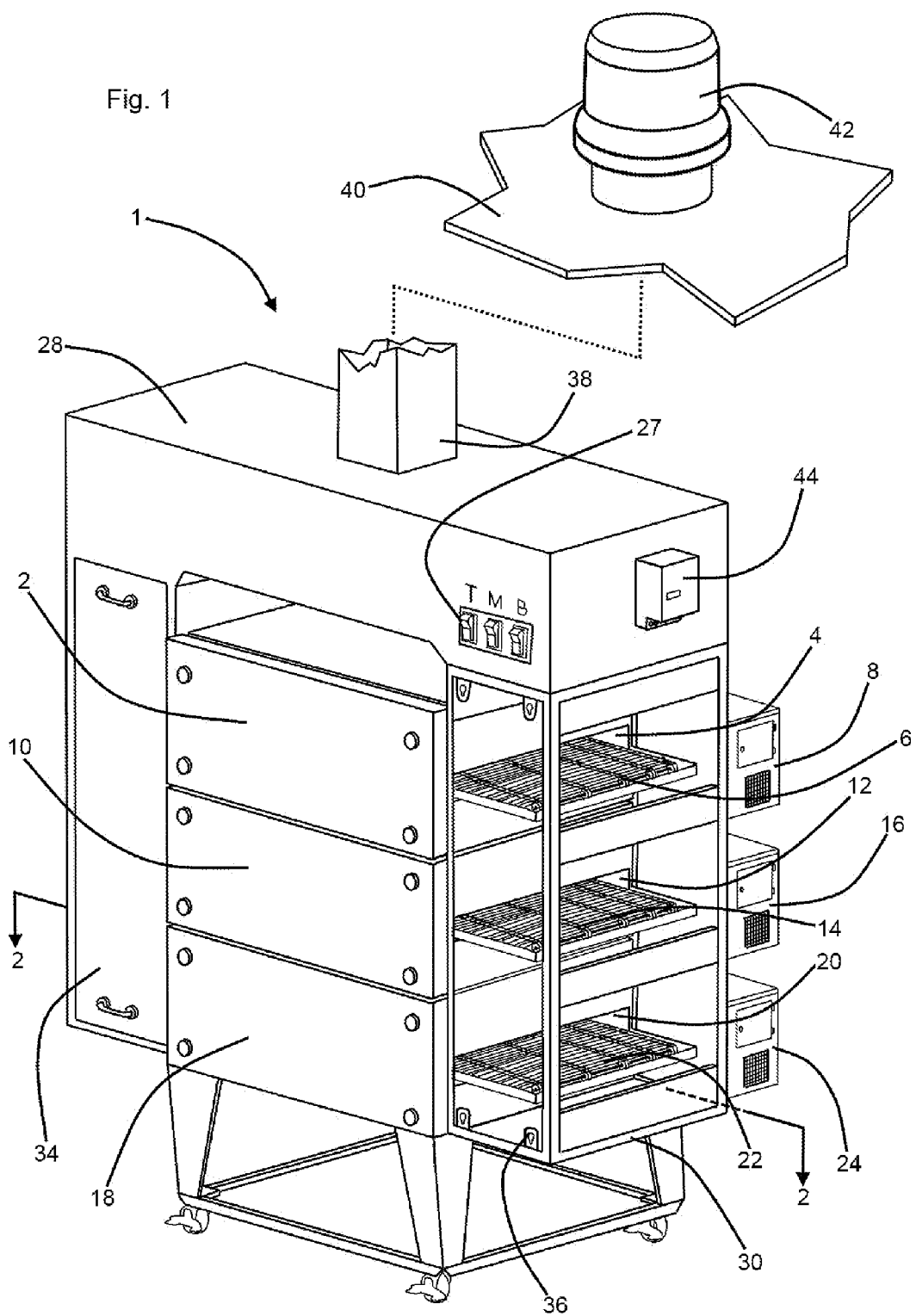
FIG. 1 is a perspective view of the instant inventive vertically stacked air impingement tunnel oven.
Figure 2:
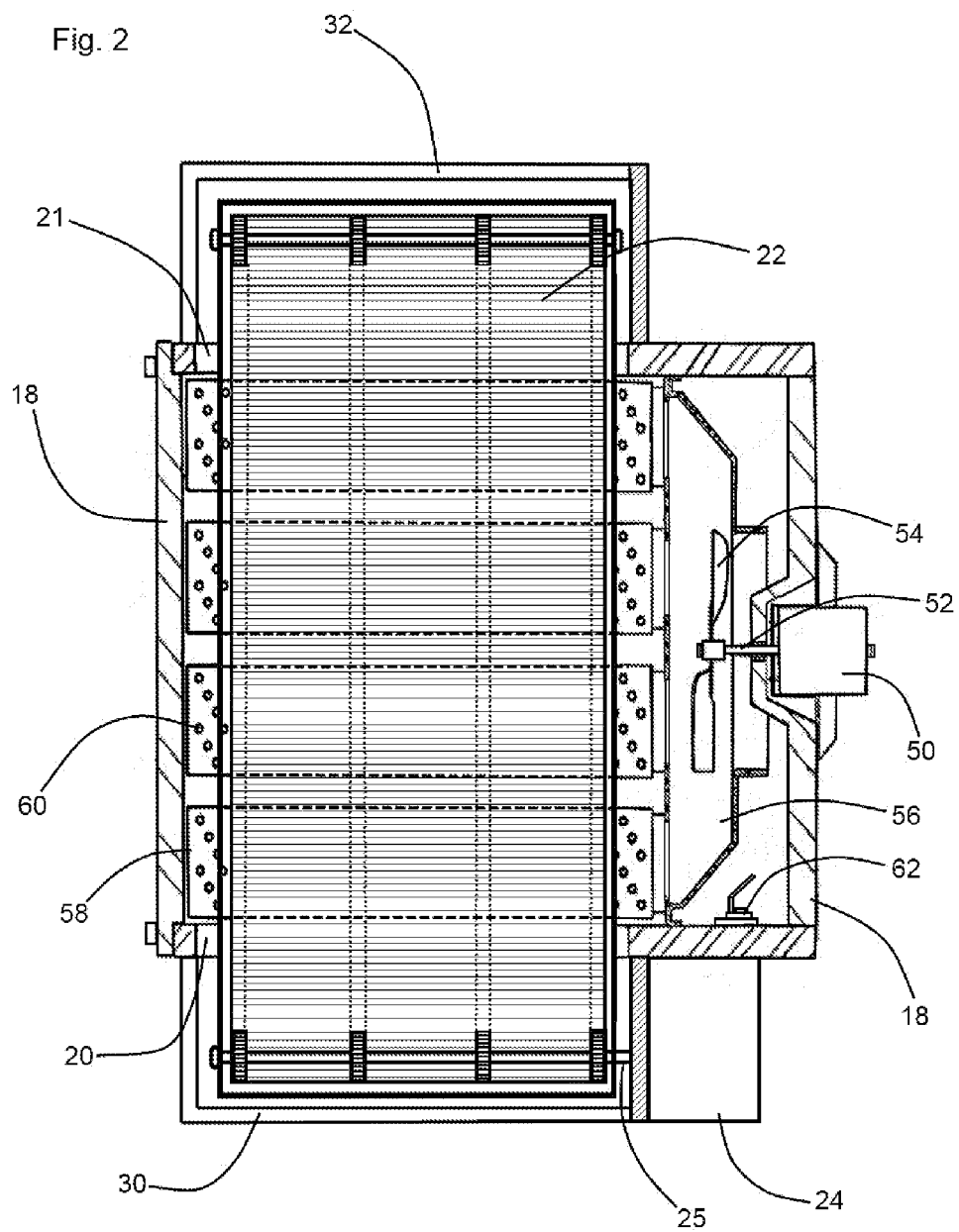
FIG. 2 is a sectional view as indicated in FIG. 1.

Referring now to the drawings, and in particular to FIG. 1, a preferred embodiment of the instant inventive vertically stacked air impingement tunnel oven is referred to generally by reference arrow 1. The inventive oven preferably comprises a series of vertically stacked baking cases 2, 10, and 18. Referring further to FIG. 2, each of such baking cases 2, 10, and 18 preferably has longitudinal and oppositely longitudinal food passage ports which are substantially identical to the ports 20 and 21 of case 18, the longitudinal food passage ports 4 and 12 of upper and intermediate baking cases 2 and 10 being shown within view of FIG. 1. Each of the baking cases 2, 10, and 18 preferably further has a longitudinally extending continuous loop, grate or cooking rack type food conveyor 6, 14, and 12 extending there through from their longitudinal food passage ports to their oppositely longitudinal food passage ports.

Referring simultaneously to FIGS. 1 and 2, air plenum 56, finger duct 58, and impingement air jets 60 combinations are preferably mounted within the interior of each of the baking cases 2, 10, and 18, such combinations including an impingement air driving fan or blower 54. Such fans or blowers 54 are preferably driven by electric motors 50 and drive axle 52 combinations. Third motor means of the instant invention preferably comprise such motors 50, the inventions first and second motor means being further discussed below.

Referring further to FIGS. 1 and 2, each of the baking cases 2, 10, and 18 also preferably has a side wall mounted control case 8, 16, and 24, such cases containing and supporting conveyor motors which communicate rotary power to the conveyors 6, 14, and 22 by means of drive axles 25. The control cases additionally house and support electronically valved and ignitable gas burners 62 for heating cooking air within the baking cases 2, 10, and 34. The invention's second motor means preferably comprise the conveyor motors, while the invention's heater means comprise the gas burners 62.

Referring further simultaneously to FIGS. 1 and 2, the instant inventive oven preferably further comprises an overarching exhaust hood 28 whose longitudinal and oppositely longitudinal downwardly opening inlets directly overlie the vertically aligned food passage ports 4,12,20,21 of the baking cases 2, 10, and 18. In order to better direct and contain combustion gases and smoke emitted from the food passage ports, the exhaust hood 28 preferably includes attached longitudinal and oppositely longitudinal food passage port covering extensions 30 and 32, such extensions having attachable and removable access panels 34 which are mountable upon panel mounts 36.

Referring further simultaneously to FIGS. 1 and 2, the first motor means of the instant inventive tunnel oven preferably comprises a variable speed three phase electric induction motor which, in assembly with a rotatably driven exhaust fan, are supported and housed within exhaust fan housing 42. Such exhaust assembly and housing 42 are suitably mounted upon a roof or side wall 40 of a commercial kitchen within which the inventive oven 1 is operated. Duct work 38 extending upwardly from the exhaust hood 28 preferably communicates with the powered exhaust assembly 42 for drawing smoke and combustion gases from the food passage ports 4,12,20,21, upwardly through extensions 30 and 32, into the exhaust hood 28, and then upwardly through duct 38 for expulsion into the outdoor environment.

The inventive oven's first motor means comprising the preferred variable speed three phase electric induction motor which is housed within the exhaust assembly housing 42, the heater means 62 which are housed within and supported by control cases 8, 16, and 24, the second motor means which comprise electric conveyor driving motors which are also supported and housed within control cases 8, 16, and 24, and the third motor means which comprise air impingement fan driving electric motors 50 which are supported and mounted upon the rear walls of the baking cases 2, 10, and 18, each further comprise and jointly include a plurality of on/off switches 27. In a preferred embodiment, the heater means, the second motor means, and the third motor means, in incorporating the switch plurality 27, establish direct or one-to-one operative controls wherein an "on" position of any one of the switches simultaneously actuates the heater means, the conveyor driving second motor means, and the impingement fan driving third motor means which are operatively associated with the one of the baking cases 2, 10, or 18 which is associated with that one switch. For example, recognizing that baking case 10 is an intermediate or middle baking case, an operator's turning the switch labeled "M" to its "on" position simultaneously actuates the middle baking case's heater means, its conveyor, and its air impingement blower. Alternative manipulations of the switches "T" or "B" similarly respectively actuate the heater and motor means which are operatively associated with the top baking case 2 or the bottom baking case 18.

Just as the instant invention's heater means and second and third motor means incorporate and comprise the plurality of electrical off switches 27, along with their electrical connections, the exhaust fan driving first motor means preferably incorporate and comprise those same on/off switches. However, unlike the direct and one-to-one electrical connections and associations of the switches 27 with the baking cases' heater means and second and third motor means, switches 27 are electrically connected or associated with the air exhausting first motor means for selective and preset exhaust fan speed control.

In a preferred embodiment of the instant invention, upon turning of switch "T" to its "on" position, the exhaust fan is advantageously operated at a low preset rotation speed. Upon alternative turning of switch "B" to its "on" position, said exhaust fan is operated at a preset high rotation speed, and upon further alternative turning of switch "M" to its "on" position, the exhaust fan is operated at an intermediate rotation speed.

Such selectively switched variable speed control is preferably achieved through incorporation within and as a part of the first motor means and alternating current inverting and variable frequency drive controller unit 44, such controller being of the type capable of translating switch position inputs from switches 27 into various and preset voltage and pulse width modulated output signals for driving the preferred variable speed three phase induction motor 42 at desired preset speeds. Suitably, the controller 44 may be preset according to means and methods conventionally known to those skilled in the art to establish a hierarchy of exhaust fan rotation speeds wherein turning switch "T" on, and turning switches "M" and "B" off, produces a lowest rotation speed; wherein turning switch "M" on, and turning switches "T" and "B" off, produces a next highest rotation speed; wherein turning switches "T" and "M" on, and turning switch "B" off, produces a next highest rotation speed; wherein turning switch "B" on, and turning switches "T" and "M" off, produces a next highest rotation speed; wherein turning switches "T" and "B" on, and turning switch "M" off, produces a next highest rotation speed; wherein turning switches "M" and "B" on, and turning switch "T" off, produces a next highest rotation speed; and wherein turning each of switches "T", "M", "B" on produce a highest rotation speed. Such speed setting hierarchy advantageously optimizes the performance of the exhaust hood 28,30,34.

Figure 3:
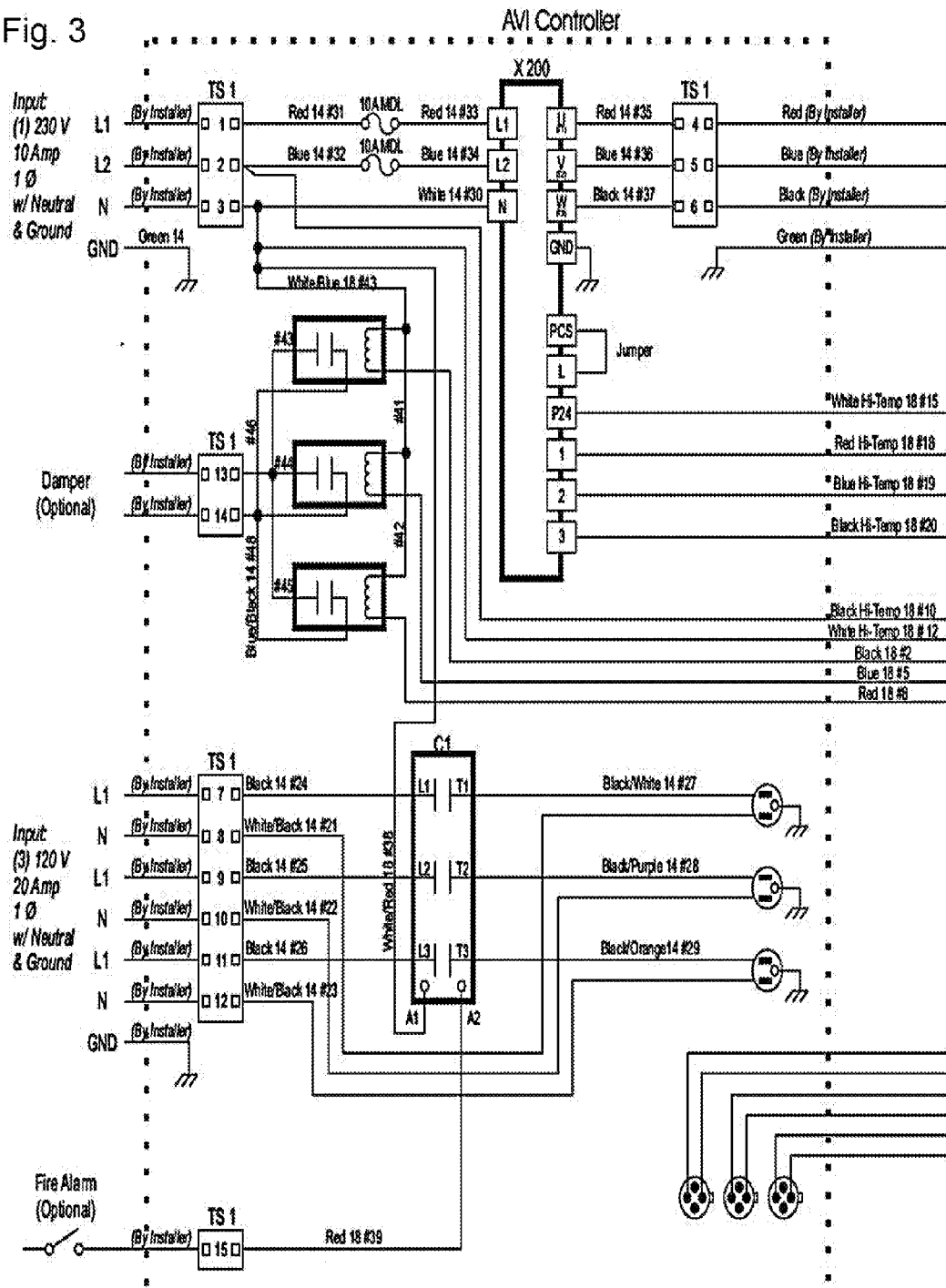
FIG. 3 presents a representational schematic of suitable electronic circuitry associated with the instant invention.
Figure 4:
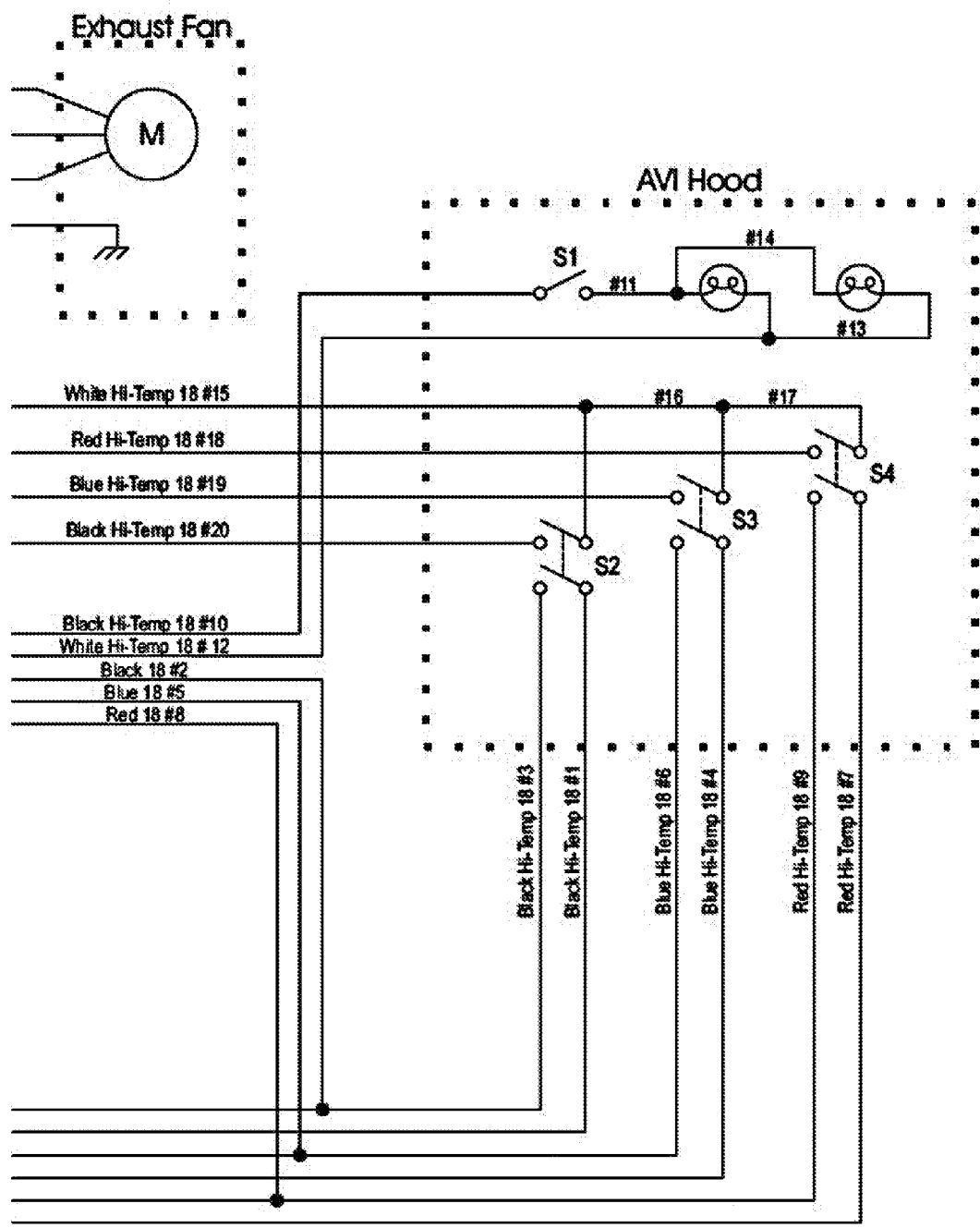
FIG. 4 is a continuation of the electrical schematic diagram of FIG. 3.

Reference to FIGS. 3 and 4 shows a suitable electric schematic diagram of the heater means' and the first, second, and third motor means' electric switching and circuitry.

In use of the instant inventive vertically stacked air impingement tunnel oven, an operator may simply and conveniently choose which case or which combination of cases among baking cases 2, 10, and 18, to actuate and utilize for food conveyor and air impingement cooking. Thereafter, the operator may simply and conveniently directly set the corresponding on/off switches "T", "M", or "B" or an applicable combination thereof, to its "on" position or their "on" positions. According to instant invention, completion of those simple steps appropriately actuates the oven's heater means and second and third motor means in accordance with the needs of the selected baking cases, and such steps additionally advantageously actuates the oven's exhaust fan first motor means at a preset speed which is optimized for purging exhaust gases emitting from the selected baking cases, and is optimized for reducing any excess and undesirable cooking gas aspirating air flow into the exhaust hood 28, 30, and 34.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A vertically stacked air impingement tunnel oven comprising:
    (a) a plurality of baking cases, each baking case having an interior space, a longitudinal food passage port, and an oppositely longitudinal food passage port, the baking cases' vertical stack vertically aligning their longitudinal and oppositely longitudinal food passage ports;
    (b) heater means connected operatively to the baking cases, said heater means being adapted for heating selected groups of baking cases among the plurality of baking cases, said heater means being controlled by a plurality of on/off switches which are electrically connected for correspondingly actuating said heater means' heating of the selected baking case groups;

(c) an exhaust hood and exhaust fan combination, said combination comprising an exhaust inlet overlying an uppermost food passage port among the baking cases' longitudinal and oppositely longitudinal food passage ports; and (d) first motor means connected operatively to the exhaust fan, the first motor means being adapted for alternatively rotating the exhaust fan at any rotation speed among a plurality of rotation speeds, the first motor means being controlled by the plurality of on/off switches, and the plurality of on/off switches being further electrically connected for, upon said switches' corresponding actuations of the selected heater means, further actuating the exhaust fan at a corresponding rotation speed among the plurality of rotation speeds.

2. The vertically stacked air impingement tunnel oven of claim 1 comprising a plurality of continuous loop conveyors, each continuous loop conveyor extending through the interior of one of the cases among the plurality of baking cases from said one baking case's longitudinal food passage port to said one baking case's oppositely longitudinal food passage port, and further comprising second motor means connected operatively to the continuous loop conveyors, the second motor means being controlled by the plurality of on/off switches, and the plurality of on/off switches being further electrically connected for, upon said switches' corresponding actuations of the selected heater means, further actuating a corresponding continuous loop conveyor or corresponding continuous loop conveyors among the cases' plurality of continuous loop conveyors.

3. The vertically stacked air impingement tunnel oven of claim 2 comprising a plurality of impingement fan, air plenum, air duct, and air jets combinations, each such combination being mounted within one of the baking cases and being positioned for directing fan propelled air from said each combination's air jets toward said one baking case's continuous loop conveyor, and further comprising third motor means connected operatively to the impingement fans, the third motor means being controlled by the plurality of on/off switches, and the plurality of on/off switches being further electrically connected for, upon said switches' corresponding actuations of the selected heater means, further actuating a corresponding impingement fan or corresponding impingement fans among the cases' impingement fan, air plenum, air duct, and air jets combinations.

4. The vertically stacked air impingement tunnel oven of claim 3 wherein the exhaust fan's plurality of rotation speeds comprise a lowest speed, and wherein the plurality of on/off switches are further electrically connected for, upon said switches' actuation of the heater means' for heating a baking case group comprising an upper baking case among the plurality of baking cases, actuating the exhaust fan at said lowest rotation speed.

5. The vertically stacked air impingement tunnel oven of claim 4 wherein the exhaust fan's plurality of rotation speeds comprise a highest speed, and wherein the plurality of on/off switches are further electrically connected for, upon said switches' actuation of the heater means' for heating a first baking case group comprising a lower baking case among the plurality of baking cases, actuating the exhaust fan at said highest rotation speed.

6. The vertically stacked air impingement tunnel oven of claim 5 wherein the exhaust fan's plurality of rotation speeds comprise an intermediate rotation speed, and wherein the plurality of on/off switches are further electrically connected for, upon said switches' actuation of the heater means for heating a second group of baking cases among the plurality of baking cases, actuating the exhaust fan at said intermediate rotation speed.

7. The vertically stacked air impingement tunnel oven of claim 6 wherein the first motor means comprise a variable speed three phase electric induction motor, said motor being connected operatively to the exhaust fan.

8. The vertically stacked air impingement tunnel oven of claim 7 wherein the first motor means further comprise an alternating current input signal inverting and variable frequency drive controller, said controller being mounted in electrical communication with the plurality of on/off switches, and in electrical communication with the variable speed three phase electric induction motor.

9. The vertically stacked air impingement tunnel oven of claim 1 wherein the heater means comprise electric resistance heaters or electrically actuated gas burners.

10. The vertically stacked air impingement tunnel oven of claim 2 wherein the second motor means comprise a plurality of electric motors, each motor among the plurality of electric motors being operatively connected to one of the continuous loop conveyors.

11. The vertically stacked air impingement tunnel oven of claim 3 wherein the third motor means comprise a plurality of electric blower motors, each electric blower motor among the plurality of electric blower motors being operatively connected to one of the impingement fans.

* * * * *